(12) United States Patent
Umehara

(10) Patent No.: US 9,063,394 B2
(45) Date of Patent: Jun. 23, 2015

(54) LENS PROTECTOR AND IMAGING DEVICE INCORPORATING THE SAME

(71) Applicant: Hideaki Umehara, Yokohama (JP)

(72) Inventor: Hideaki Umehara, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/398,174

(22) PCT Filed: Apr. 18, 2013

(86) PCT No.: PCT/JP2013/062150
§ 371 (c)(1),
(2) Date: Oct. 31, 2014

(87) PCT Pub. No.: WO2013/172167
PCT Pub. Date: Nov. 21, 2013

(65) Prior Publication Data
US 2015/0093103 A1    Apr. 2, 2015

(30) Foreign Application Priority Data

May 18, 2012    (JP) .................................. 2012-114259

(51) Int. Cl.
| | | |
|---|---|---|
| *G03B 17/00* | (2006.01) | |
| *G03B 11/04* | (2006.01) | |
| *G03B 17/02* | (2006.01) | |
| *H04N 5/225* | (2006.01) | |

(52) U.S. Cl.
CPC .............. *G03B 11/043* (2013.01); *G03B 17/02* (2013.01); *H04N 5/2252* (2013.01)

(58) Field of Classification Search
CPC ... G03B 11/043; G02B 23/2484; G02B 23/16
See application file for complete search history.

(56) References Cited

U.S. PATENT DOCUMENTS

| | | | |
|---|---|---|---|
| 4,488,788 A | 12/1984 | Fujioka | |
| 6,987,532 B1* | 1/2006 | Kawahara | ................... 348/220.1 |
| 8,233,052 B2* | 7/2012 | Augusto | ................... 348/207.99 |
| 2004/0263666 A1 | 12/2004 | Tsuji et al. | |

FOREIGN PATENT DOCUMENTS

| | | |
|---|---|---|
| JP | 58-156916 | 9/1983 |
| JP | 63-24213 | 2/1988 |
| JP | 2000-199926 | 7/2000 |
| JP | 2000-322564 | 11/2000 |
| JP | 2001-13544 | 1/2001 |
| JP | 2004-325518 | 11/2004 |
| JP | 2006-323079 | 11/2006 |
| JP | 2010-282053 | 12/2010 |

OTHER PUBLICATIONS

International Search Report issued on May 28, 2013 in PCT/JP2013/062150 filed on Apr. 18, 2013.

* cited by examiner

*Primary Examiner* — WB Perkey
(74) *Attorney, Agent, or Firm* — Oblon, McClelland, Maier & Neustadt, L.L.P.

(57) ABSTRACT

A lens protector is provided for a wide-angle lens of an imaging device, the wide-angle lens including a curved surface projecting towards a subject and forming an image circle partially protruding from an imaging plane on which an image of the subject is formed. The lens protector includes at least two projections opposing each other with an optical axis of the wide-angle lens in-between, extending along the curved surface of the wide-angle lens from a subject side of a device body, and projecting further towards the subject than the curved surface to cover a part of the curved surface which corresponds to a part of the image circle protruding from the imaging plane.

5 Claims, 6 Drawing Sheets

LENS PROTECTOR AND IMAGING DEVICE INCORPORATING THE SAME

CROSS REFERENCE TO RELATED APPLICATION

The present application is based on and claims priority from Japanese Patent Application No. 2012-114259, filed on May 18, 2012, the disclosure of which is hereby incorporated by reference in its entirety.

TECHNICAL FIELD

The present invention relates to a lens protector for the lens of an imaging device such as film camera, digital camera, or mobile device with a photographic function and an imaging device incorporating such a lens protector.

BACKGROUND ART

The imaging device uses a wide-angle lens with a wide angle of view to capture an image of a subject in a wide area on a film or the imaging plane of the image sensor. Japanese Patent No. S61-028972 and No. H05-002204 disclose a wide-angle lens including a convex-shape lens on a subject side, for example. The convex portion of the wide-angle lens is generally formed to protrude from a device body. Also, there is an imaging device having a detachable or incorporated wide-angle lens which achieves the angle of view of 180 degrees or more.

If the imaging device is accidentally dropped or placed with the convex side of the wide-angle lens down, the wide-angle lens may be damaged or broken. To prevent the damage, several types of lens protectors for the wide-angle lens are available, such as a transparent, semi-spherical protector, a cylindrical protector with an openable top plate, and a detachable cylindrical protector.

Further, Japanese Patent No. 2992028 discloses a cover-type lens protector comprised of a transparent cylinder provided around a lens system projecting from a device body and a transparent plate to cover the opening of the cylinder, to protect a wide-angle lens in the manner not to narrow the angle of view thereof.

In recent years various types of electronic devices having photographic functions have been popular, for example, mobile devices such as notebook computer, smart phones, tablet terminals in addition to film or digital cameras. There are users' demands for the use of a wide-angle lens with a wider angle of view in such mobile devices without impairing the outer appearance and designs thereof. The mobile device also requires a lens protector for the wide-angle lens.

However, the known lens protectors described above are not suitable for the wide-angle lenses of the mobile devices. This is because the lens protector needs to be larger than a lens system protruding from a device body so that it requires a large area for mounting on the subject side of the wide-angle lens. Accordingly, the lens protector greatly protrudes from the device body, impairing the appearance of the mobile device.

Meanwhile, for the purpose of reducing the amount of protrusion of the lens protector from the device body, a subject-side lens of the wide-angle lens can be placed in a receded position. However, in this case the angle of view of the wide-angle lens may be blocked by the device body and limited.

Moreover, the detachable, cylindrical type is supposed to be taken off during photographing. If the device is accidentally dropped in shooting operation, the convex portion of the wide-angle lens cannot be protected.

Further, even the cover-type lens protector in Japanese Patent No. 2992028 has to be larger than the lens system so that it faces the same problem in largely projecting from the device body and impairing the physical appearance of the mobile device.

SUMMARY OF THE INVENTION

The present invention aims to provide a lens protector which can protect a wide-angle lens of an imaging device during photographic operation without limiting the angle of view thereof and contributes to improving the physical appearance of the imaging device.

According to one embodiment, a lens protector is provided for a wide-angle lens of an imaging device, the wide-angle lens including a curved surface projecting towards a subject and forming an image circle partially protruding from an imaging plane on which an image of the subject is formed. The lens protector includes at least two projections opposing each other with an optical axis of the wide-angle lens in-between, extending along the curved surface of the wide-angle lens from a subject side of a device body, and projecting further towards the subject than the curved surface to cover a part of the curved surface which corresponds to a part of the image circle protruding from the imaging plane.

BRIEF DESCRIPTION OF THE DRAWINGS

Features, embodiments, and advantages of the present invention will become apparent from the following detailed description with reference to the accompanying drawings.

DETAILED DESCRIPTION OF EMBODIMENTS

Hereinafter, embodiments of an imaging device to which the present invention is applied will be described in detail with reference to the accompanying drawings. Wherever possible, the same reference numbers will be used throughout the drawings to refer to the same or like parts.

First Embodiment

Figure 1A:
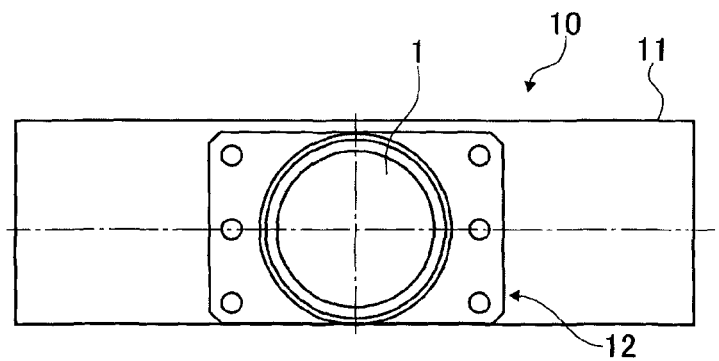
FIGS. 1A, 1B show a camera module according to a first embodiment by way of example.
Figure 1B:
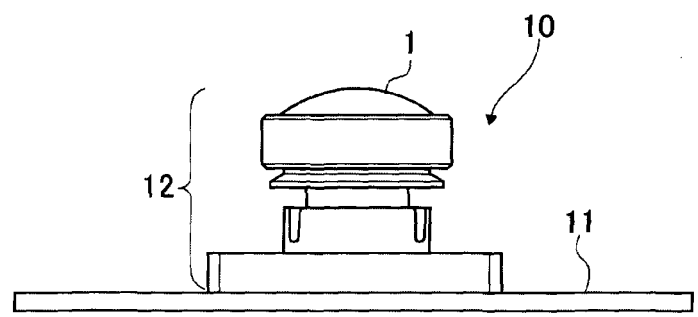
Figure 2:
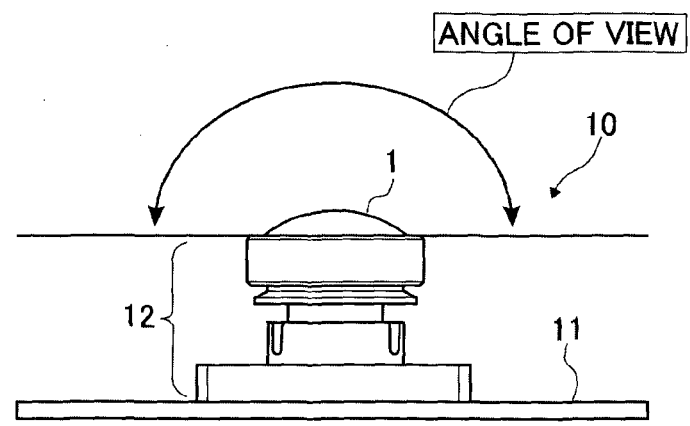
FIG. 2 shows the camera module in FIG. 1B with angle of view of 180 degrees.
Figure 3:
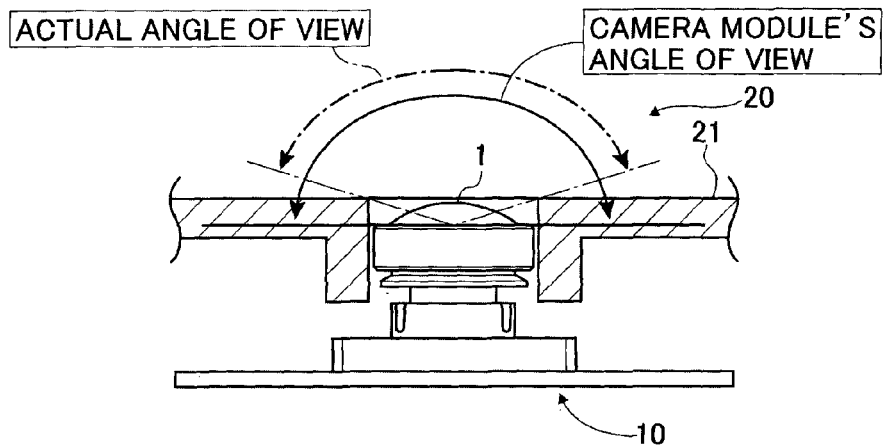
FIG. 3 shows a limited angle of view of a camera unit which contains a subject-side lens of the camera module with angle of view of 180 degrees in such a manner not to protrude from a unit case.

A first embodiment of the imaging device will be described referring to FIG. 1A to FIG. 7. FIG. 1A is a plan view of a camera module 10 and FIG. 1B is a side view of the same. FIG. 2 shows the 180-degree angle of view of the camera module 10. FIG. 3 shows an example of a camera unit 20 having a subject-side lens of the camera module 10 adapted not to project from a subject-side surface of a unit case 21.

Figure 4A:
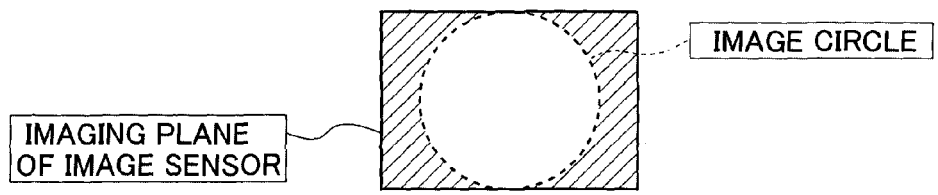
FIGS. 4A to 4C show the relation between an image circle of the camera module with angle of view of 180 degrees and an image sensor.
Figure 4B:
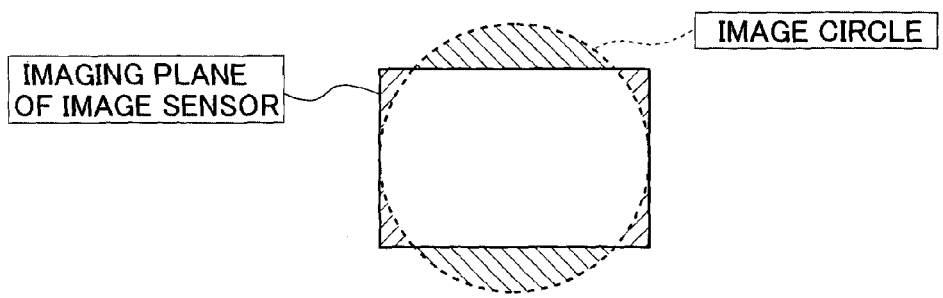
Figure 4C:
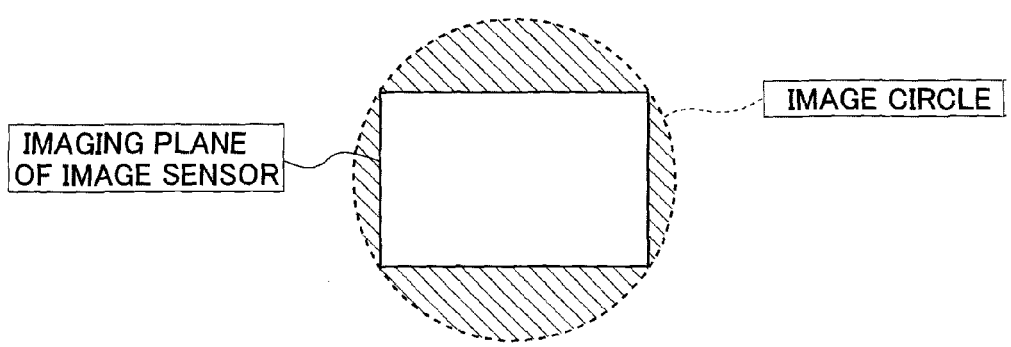
Figure 5A:
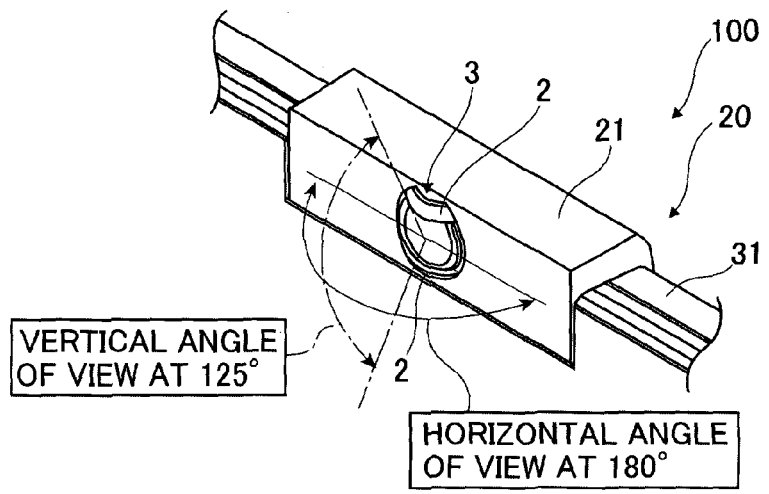
FIGS. 5A to 5C show a lens protector provided in a portion of the camera module irrelevant to the angle of view and including projections to a subject side according to the first embodiment by way of example.
Figure 5B:
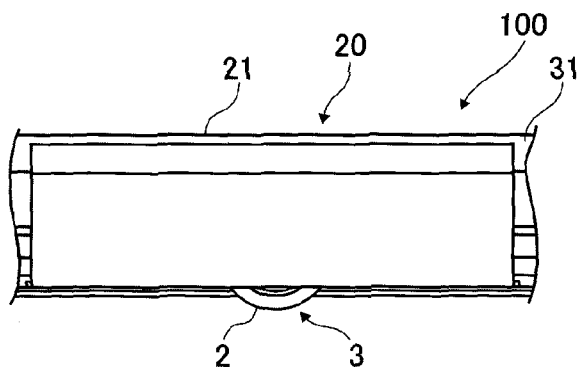
Figure 5C:
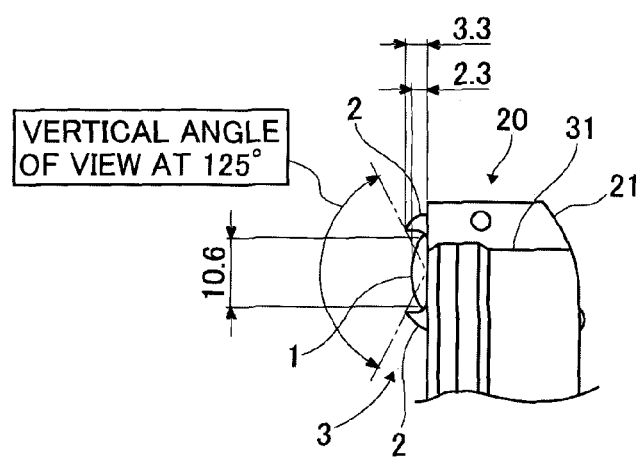
Figure 6A:
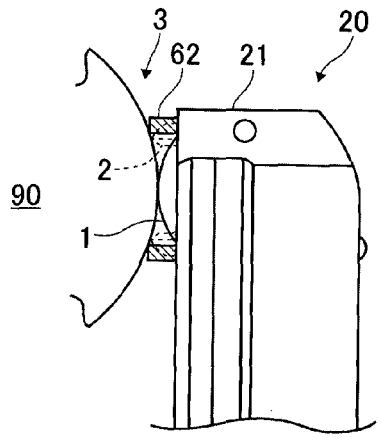
FIGS. 6A, 6B show an example of a lens protector having projections in an exterior of the subject-side lens.
Figure 6B:
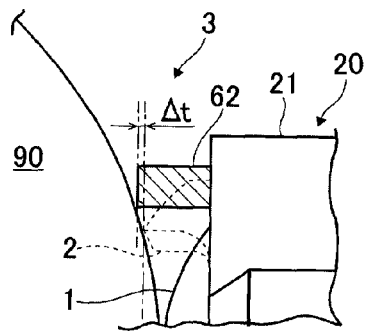
Figure 7:
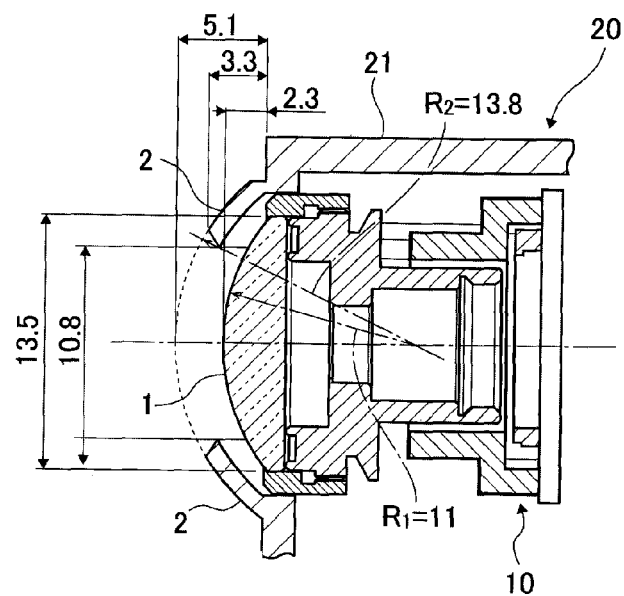
FIG. 7 is a cross section view of a lens protector integrated with the unit case by way of example.

FIGS. 4A to 4C show relations between an image sensor and the image circle of the camera module 10 at angle of view of 180 degrees when an image is formed on the image sensor in a space of 180 degrees in all horizontal and vertical directions, on a horizontal line passing the center of a rectangular image sensor or the optical axis of a wide-angle lens, and on diagonal lines of a rectangular image sensor, respectively. FIGS. 5A to 5C are a perspective view, a plan view, and a side view of a lens protector 3 provided in a portion of the camera module 10 not to affect the angle of view thereof and having projections 62 projecting closer to a subject than the subject-side lens 1. FIGS. 6A, 6B are a side view and an enlarged view of the lens protector 3 having the projection 62 in an exterior of the subject-side lens 1 by way of example. FIG. 7 is a cross section view of the lens protector 3 integrated with the unit case 21 by way of example.

In the present embodiment a tablet terminal 100 as the imaging device having camera units 20 is described by way of example. The tablet terminal 100 comprises a liquid crystal display with an electrostatic touch panel and two camera units 20 on the top of a long side and the middle of a left short side of a bezel of the display to shoot still images and moving images. The camera units 20 on the long side capture a subject on the front side of the LCD while that on the left short side captures a subject on the back side thereof. Further, with use of the camera unit 20 on the long side, a video conference or the like is feasible via an internet connection, using microphones, head phones and speakers.

The tablet terminal 100 is a general tablet terminal available in the market except for including the camera units 20 to which the present invention is applied. Therefore, a description of the structure and operation of the tablet terminal 100 is omitted. The present invention is applied to the camera units 20 of the tablet terminal 100 as the imaging device by way of example. It should not be limited to such an example. It is applicable to various types of mobile devices such as notebook computer, portable phone, smart phone and TVs, monitors, film cameras, and digital cameras. It is also applicable to web cameras attached to TVs or monitors for use.

First, the basic structure of the camera module 10 of each camera unit 20 is described. In FIGS. 1A, 1B the camera module 10 comprises a lens unit 12 including a wide-angle lens and a printed circuit board (PCB) 11 on which a not-shown image sensor is mounted. It is supported in the unit case 21 of the camera unit 20 or the chassis of the tablet terminal 100 via a stay. Herein, the wide-angle lens refers to a lens with a wider angle of view than a general standard lens with horizontal angle of view of 45 to 55 degrees. The image sensor can be a CCD or CMOS.

In FIG. 1A the lens unit 12 is fixed on the PCB 11 so that the optical axis thereof matches the center of the image sensor. Also, it includes lenses between the subject-side lens 1 closest to a subject and the image sensor and a lens driver to focus on a subject and optically change a focal length, as shown in FIG. 1B.

The camera module 10 is a wide-angle camera which uses the optical refraction of lenses to achieve horizontal angle of view of 180 degrees as in FIG. 2. The subject-side surface of the subject-side lens 1 is a curved surface projecting to the subject side. If the tablet terminal 100 incorporating the camera module 10 is accidentally dropped or placed with the curved surface of the subject-side lens 1 down, the curved surface of the subject-side lens 1 may be scratched or damaged.

To prevent such a problem, the subject-side lens 1 can be mounted in the unit case 21 of the camera unit 20 so as not to project from the subject side of the unit case 21 as shown in FIG. 3. However, protecting the subject-side lens 1 with the unit case 21 causes another problem with limiting the angle of view of the camera module 10. Thus, the angle of view of the imaging device is limited by protecting the wide-angle lens with the chassis of the imaging device.

With such a limitation to the angle of view, even the wide angle camera having a square-shape image sensor and all-round angle of view of 180 degrees can exert only 150 degrees of actual angle of view both horizontally and vertically. It cannot fully exert its function. Meanwhile, wide-angle photographing is needed mostly in a single orientation such as horizontally or vertically. For example, the aspect ratio (ratio of longitudinal and transverse lengths) of display devices as LCD is set mostly at 4/3 or 16/9 which are different in the ratio of longitudinal and transverse lengths. It is important to set the aspect ratio of the image sensor (hereinafter, sensor aspect ratio) of the wide-angle camera in line with that of the display device (hereinafter, display aspect ratio).

FIGS. 4A to 4C show the relation between the image sensor with the aspect ratio of 4/3 and the image circle of the lens unit 12 of the camera module 10 on which an image of a subject is clearly formed. The image circle is on a plane extended from the imaging plane orthogonal to the optical axis of the wide-angle lens.

In FIG. 4A the image circle is inscribed in the imaging plane contacting the top and bottom long sides thereof (corresponding to 4) so that an image of a subject is captured in a 180-degree space in all-round direction. That is, the angle of view is set to 180 degrees in all-round direction, in other words, the vertical angle of view is set to 180 degrees. However, there is an area of the image sensor indicated by left downward hatching in FIG. 4A in which the image circle is not formed, therefore, the image sensor is not effectively used. Further, it is difficult to provide an element to protect the subject-side lens without causing degradation in the image quality. With use of a known transparent semi-spherical lens protector, in a case where the lens protector is smeared or scratched, deterioration in the image quality may occur.

In FIG. 4B the image circle internally contacts the middle points of the right and left short sides (corresponding to 3) of the imaging plane of the image sensor to form an image of a subject in a 180-degree space on a horizontal line passing the center of the image sensor. That is, a horizontal angle of view is set to 180 degrees. The left-downward hatched area including no image circle in FIG. 4B is reduced from that in FIG. 4A in which the angle of view is 180 degrees in all-round direction. Thus, the image sensor can be more effectively used to generate good images. However, still, the hatched area at the corners of the image sensor cannot be eliminated, and images on a part of the image circle protruding from the imaging plane (indicated by right-downward hatching) cannot be generated.

In FIG. 4C the image circle is circumscribed in the four corners of the imaging plane of the image sensor to form an image of a subject in a 180-degree space on the diagonal lines of the image sensor. That is, a diagonal angle of view is set to 180 degrees. Unlike FIGS. 4A, 4B, there is no area of the imaging plane on which the image circle is not formed so that the image sensor can be most effectively used. However, since the image circle encloses the imaging plane, a periphery area thereof protrudes from the imaging plane, as indicated by right-downward hatching, and images on this area cannot be generated.

Moreover, to shoot a subject at a horizontal angle of view of 180 degrees, that is, form an image of a subject in a 180-degree space on a horizontal line passing the center of the image sensor, a vertical angle of view will be as follows depending on the display aspect ratio. At the display aspect ratio being 4/3, when a horizontal angle of view equivalent to 4 is 180 degrees, a vertical angle of view equivalent to 3 is 135.00 degrees. At the display aspect ratio being 16/9, when a horizontal angle of view equivalent to 16 is 180 degrees, a vertical angle of view equivalent to 9 is 101.25 degrees. Thus, at different display aspect ratios, the necessary angle of view will be different. For example, in a certain direction the angle of view of 180 degrees is necessary but in another direction the angle of view of less than 180 degrees is sufficient.

Thus, it is effective to provide the lens protector in the subject-side area of the camera unit 20 to block the hatched areas of the image circle in FIGS. 4B, 4C. That is, the lens protector can protrude from the chassis of the tablet terminal 100 towards a subject further than the wide-angle lens to the extent that the angle of view of the wide-angle lens is not blocked.

In view of the above, the tablet terminal 100 comprises the lens protector 3 with the projections 2 provided in the unit case 21 to protect the subject-side lens 1, as shown in FIGS. 5A to 5C. The projections 2 are configured to project further than the subject-side lens 1. In the camera unit 20 both the display aspect ratio and sensor aspect ratio are set to 16/9. The camera unit 20 comprises optical zoom function and digital zoom function and the image sensor includes a large number of pixels. In the digital zoom the number of images to display or store is changeable. From the horizontal angle of view of 180 degrees to the diagonal angle of view of 180 degrees, the camera unit 20 performs optical zoom to adjust the angle of view and reduce deterioration in image quality in wide angle range.

In FIG. 5A, for the purpose of securing the horizontal angle of view of 180 degrees and the vertical angle of view of 101.25 degrees of the camera unit 20, the lens protector 3 is integrated with the unit case 21 of the camera unit 20 of the tablet terminal 100. The drawing shows that the camera unit 20 is set to be able to secure the vertical angle of view of 125 degrees by way of example. It can be configured to secure the vertical angle of view of 101.25 degrees or more. The lens protector 3 includes the two projections 2 protruding from the unit case 21 to partially cover the top and bottom of the subject-side lens 1.

As seen from the top in FIG. 5B, the projections 2 are of an arc-like shape. As seen from the side in FIG. 5C, the arc-like projections 2 partially cover the top and bottom portions of the subject-side lens, respectively. The ends of the projections 2 close to the optical axis of the subject-side lens 1 are approximately horizontal and each include an inclined portion to be distant from the opposing projection as it goes towards a subject side. The center of curvature of the arc shape of each protrusion 2 approximately coincides with that of the subject-side surface of the subject-side lens 1.

Specifically, the camera module 10 is fixed in the camera unit 20 such that the subject-side surface of the subject-side lens 1 having outer diameter of about 13.5 mm projects by 2.3 mm from the unit case 21, as shown in FIG. 5C. The two projections 2 are formed to have curved surfaces with the center of curvature at the same position as that of the curved surface of the subject-side lens 1. Thereby, the top and bottom protrusions can partially cover the top and bottom portions of the subject-side lens 1.

Further, the distance between the ends of the two opposing projections 2 is set to 10.6 mm, and a virtual vertical angle of view of the subject-side lens 1 in a vertical cross section passing the optical axis is set to 125 degrees, which is not blocked by the projections 2. By placing the projections 2 in such a manner, it is made possible to set the vertical angle of view to 101.25 degrees. Also, the inclined end portions of the projections 2 are formed to be along the virtual vertical angle of view of 125 degrees. The amount of the most projected end portions from the side face of the unit case 21 is set to 3.3 mm.

Moreover, it is not necessary to take optical property into consideration for the lens protector 3 with the projections 2. Therefore, it can be made from an impact-insusceptible material such as metal or reinforced plastic. The projections 2 themselves can be prevented from being damaged or deformed if the tablet terminal 100 is erroneously dropped, since the curved surfaces extend along those of the subject-side lens 1 and fixed at the ends to the unit case 21.

FIG. 6A shows another example of projections to secure the virtual vertical angle of view of 125 degrees in a vertical cross section passing through the optical axis of the subject-side lens 1. Projections 62 are of a plate-like shape attached to the side face of the unit case 21 outside the subject-side lens 1.

However, the projections 62 need to project further by Δt than the projections 2 indicated by the broken line in the enlarged view of FIG. 6B so as to prevent the curved surface of the subject-side lens 1 from contacting an object 90 with a certain curvature in FIG. 6A. The distance therebetween is also elongated. Because of this, a larger area is required to attach the lens protector 3 to the unit case 21, leading to impairing the outer appearance of the tablet terminal 100.

Unlike the arc-like projections 2, the plate-like projections are susceptible to impact and they are likely to be damaged or deformed if the tablet terminal 100 is fallen. Moreover, due to the longer distance between the two projections 62, the object 90 and the curved surface of the subject-side lens 1 are more likely to contact each other.

For another example, a related art transparent semi-spherical lens protector can be provided. However, there is a drawback that it has to be made from a transparent reinforced plastic or a fragile material as glass. The protector made from a fragile material may be easily broken. The protector made from a reinforced plastic needs to have a curved surface (as indicated by the broken line in FIG. 7) with the center of curvature coinciding with that of the subject-side lens 1. In this case the amount of projection thereof on the optical axis of the subject-side lens 1 is larger than that of the projections 2 from the side face of the unit case 21.

Specifically, the curvature radius R1 of the curved surface of the subject-side lens 1 is 11.0 mm while the curvature radius R2 of the broken line of the projections 2 covering the subject-side lens 1 is 13.8 mm. Therefore, the amount of projection of the projections 2 is 3.3 mm while that of the reinforced plastic protector is 5.1 mm. Thus, it requires a larger area on the subject side of the tablet terminal 100 for mounting this lens protector than the projections 2 in the present embodiment, leading to impairing the outer appearance of the tablet terminal 100. Moreover, since downsizing is an important factor for a mobile device, a wide-angle lens requiring such a lens protector may not be able to be incorporated in the mobile device.

The reinforced plastic protector can always protect the subject-side lens 1 but a portion thereof through which light in the effective angle of view transmits may be scratched or smudged if the tablet terminal 100 is dropped, which may cause degradation in image quality.

As described above, the projections 2 are adapted to project further from the unit case 21 or terminal body than the subject-side lens 1 to prevent the curved surface of the subject-side lens 1 from contacting another object. Even if the tablet terminal 100 is placed on the desk or the like with the curved surface of the subject-side lens 1 down or accidentally dropped, the subject-side lens 1 is prevented from being scratched or damaged and can be protected in shooting operation.

Further, the two projections 2 are formed to oppose to each other and cover a part of the curved surface of the subject-side lens corresponding to the area of the image circle of the lens unit 12 protruding from the imaging plane and not included in the angle of view for shooting a subject. Accordingly, the lens protector 3 can protect the curved surface of the lens unit 12 or the wide-angle lens without restricting the angle of view in shooting operation.

Further, it does not require a large area on the subject side of the wide-angle lens unlike related-art lens protectors. It is possible to reduce the area in which the lens protector is provided, contributing to improving the outer appearance and design of the tablet terminal 100.

Further, the lens protector 3 according to the present embodiment is of a simple configuration to cover a part of the top and bottom portions of the subject-side lens 1 with the two projections 2. Thus, unlike the transparent semi-spherical lens protector to entirely convert the convex portion of the wide-angle lens, it is free from the damages or smudges of the light-transmitting portion which cause degradation in the image quality.

The above embodiment has described an example of the lens protector 3 with the projections 2 above and below the subject-side lens 1 to partially cover the top and bottom portions thereof so that the horizontal angle of view becomes 180 degrees. The present invention should not be limited to such an example. The lens protector 3 is applicable to a wide-angle lens with the diagonal angle of view of 180 degrees or less, for example. For such a lens two additional projections can be provided to partially cover the right and left portions of the subject-side lens 1 so as not to restrict a shooting area in shooting operation.

Further, the above embodiment has described an example where the lens protector 3 and unit case 21 or the chassis of the tablet terminal 100 are integrated. The present invention should not be limited to such an example. Alternatively, the protector 3 and unit case 21 can be separately formed and fixed by screws or adhesion as long as the strength of the fixation is sufficiently secured.

Second Embodiment

Figure 8A:
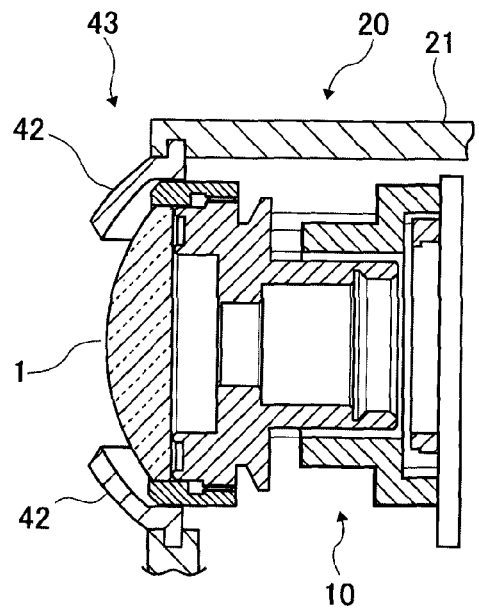
FIGS. 8A to 8C show a rotatable lens protector according to a second embodiment by way of example.
Figure 8B:
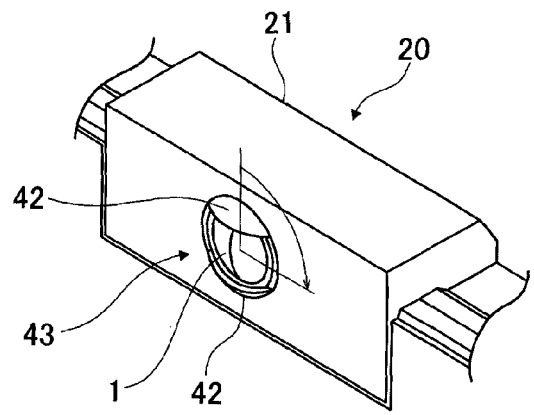
Figure 8C:
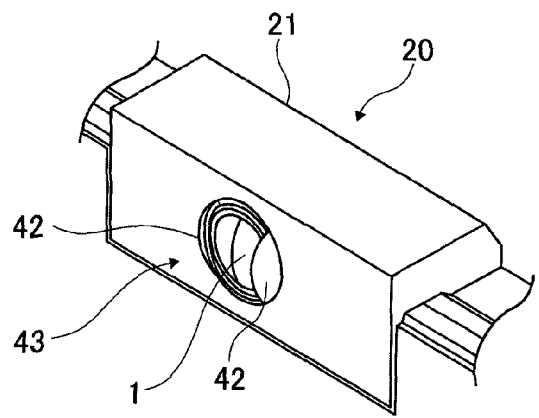

Next, an imaging device according to a second embodiment is described referring to FIGS. 8A to 8C. In the drawings a lens protector 43 is rotatably provided by way of example. The difference in the tablet terminal 100 as the imaging device from the first embodiment is in the rotatable lens protector 43 and the size of the image sensor. A description of the same configurations and effects as those in the first embodiment is omitted.

To change a photo size from a landscape size to a portrait size with a related art imaging device, a user generally rotates the device body at 90 degrees. If a user rotates the tablet terminal 100 with the display aspect ratio of 16/9 at 90 degrees for shooting a subject, it may be difficult for the user to hold the tablet terminal 100 depending on the position of a shutter button, causing camera shakes.

To solve such a problem, the camera unit 20 can be configured to be rotatable at 90 degrees. Alternatively, a landscape-size image is converted to electric signals with the image sensor at the aspect ratio of 16/9 and a vertically long area around the optical axis at the aspect ratio of 9/16 for display and storage (hereinafter, photographic aspect ratio) is digitally extracted from a horizontally long area around the optical axis at the sensor aspect ratio of 16/9.

However, in rotating the camera unit 20 at 90 degrees, contact failures or disconnection may occur over time in a flexible cable or at contact points connecting the camera unit 20 and the tablet terminal 100 for electric signal transmission. Further, by digitally changing the photographic aspect ratio, the angle of view of the camera module 10 having the image sensor cannot be changed. Therefore, the longitudinal angle of view after the change in the aspect ratio is narrowed to be equal to the vertical angle of view before the change in the aspect ratio.

In view of the above, in the tablet terminal 100 according to the present embodiment the image sensor is formed in a square shape, and the photographic aspect ratio is set to 16/9 for shooting a landscape-size image and to 9/16 for shooting a portrait-size image by a digital processing. As a result, in shooting a landscape image, a part of the top and bottom portions of the image sensor and in shooting a portrait image, a part of the right and left side portions are not used for actual display and storage.

According to the present embodiment, the lens protector 43 with the projections 42 is rotated in accordance with a change in the aspect ratio to cover the lens areas corresponding to the areas of the image sensor unused for actual display and storage.

Specifically, the lens protector 43 of the camera unit 20 is separated from the unit case 21 as shown in FIG. 8A and rotatable in the direction indicated by the arrow in FIG. 8B, for example. Along with the rotation of the lens protector 43, the projections 42 are moved from the top and bottom sides to the right and left sides, to change the virtual angle of view, which is in the vertical cross section passing through the optical axis of the subject-side lens 1 and not blocked by the projections 42, from 125 degrees to 180 degrees. Also, the horizontal angle of view in the horizontal cross section passing through the optical axis of the subject-side lens 1 is changed, from 180 degrees to 125 degrees. Thus, the lens protector 43 can protect the subject-side lens 1 of the lens unit 12 and change the direction in which the angle of view is widened. The camera unit 20 is capable of securing the horizontal angle of view of 125 degrees and secures the horizontal angle of view of 101.25 degrees or more corresponding to 9 of the photographic aspect ratio here.

Third Embodiment

Figure 9:
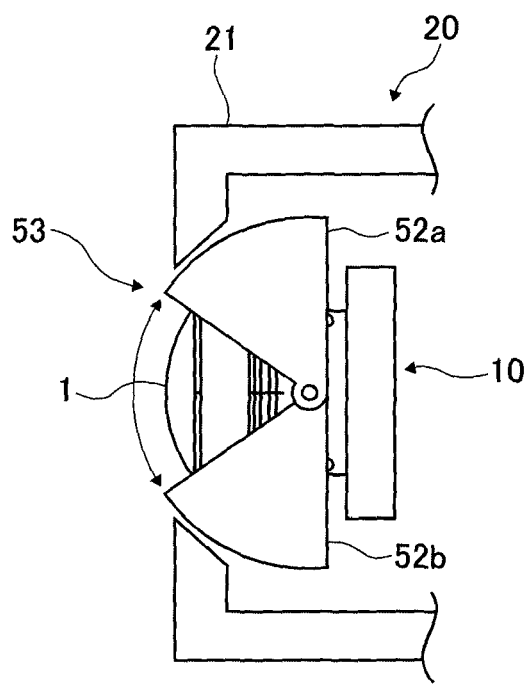
FIG. 9 shows a lens protector with openable projections according to a third embodiment by way of example.

An imaging device according to a third embodiment is described with reference to FIG. 9. FIG. 9 shows a lens protector 53 having a top projection 52a and a bottom projection 52b which are openable/closable. The difference from the tablet terminal 100 in the first embodiment is only in the lens protector 53 with the openable/closable projections 52a, 52b, therefore, a description of the rest of the structure is omitted.

According to the tablet terminal 100 in the present embodiment, the subject-side surface of the subject-side lens 1 can be entirely covered with the projections during non-use to prevent it from being scratched, damaged, or smudged if the tablet terminal 100 is accidentally dropped or while it is carried inside a bag or a case, the subject-side surface accidentally contacts another object inside it.

Specifically, as shown in FIG. 9 the lens protector 53 is separated from the unit case 21. The top and bottom projections 52a, 52b are spherical and partially cover the top and bottom portions of the subject-side lens 1, respectively. Further, the lens protector 53 comprises an electric driver for the projections to open or close them with a switch provided on the tablet terminal 100 or a touch panel. Thus, the lens protector 53 can completely cover or accommodate the subject-side lens 1 for protection in non-use.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. A lens protector for a wide-angle lens of an imaging device, the wide-angle lens including a curved surface projecting towards a subject and forming an image circle partially protruding from an imaging plane on which an image of the subject is formed, the lens protector comprising
    at least two projections opposing each other with an optical axis of the wide-angle lens in-between, extending along the curved surface of the wide-angle lens from a subject side of a device body, and projecting further towards the subject than the curved surface to cover a part of the curved surface which corresponds to a part of the image circle protruding from the imaging plane.

2. A lens protector according to claim 1, wherein
    the at least two projections are adapted to be switchably set in an opened state not to limit an angle of view of the wide-angle lens and a closed state to entirely cover a subject-side surface of the wide-angle lens.

3. An imaging device comprising a wide-angle lens to capture an image of a subject, comprising:
    a lens protector for a wide-angle lens of an imaging device, the wide-angle lens including a curved surface projecting towards a subject and forming an image circle partially protruding from an imaging plane on which an image of the subject is formed, the lens protector comprising at least two projections opposing each other with an optical axis of the wide-angle lens in-between, extending along the curved surface of the wide-angle lens from a subject side of a device body, and projecting further towards the subject than the curved surface to cover a part of the curved surface which corresponds to a part of the image circle protruding from the imaging plane.

4. An imaging device according to claim 3, wherein:
    the imaging device is adapted to change an aspect ratio of the subject image; and
    the lens protector is adapted to be able to rotate the projections around the optical axis of the wide-angle lens in accordance with a change in the aspect ratio.

5. A lens protector according to claim 3, wherein
    the at least two projections are adapted to be switchably set in an opened state not to limit an angle of view of the wide-angle lens and a closed state to entirely cover a subject-side surface of the wide-angle lens.

* * * * *